UNITED STATES PATENT OFFICE.

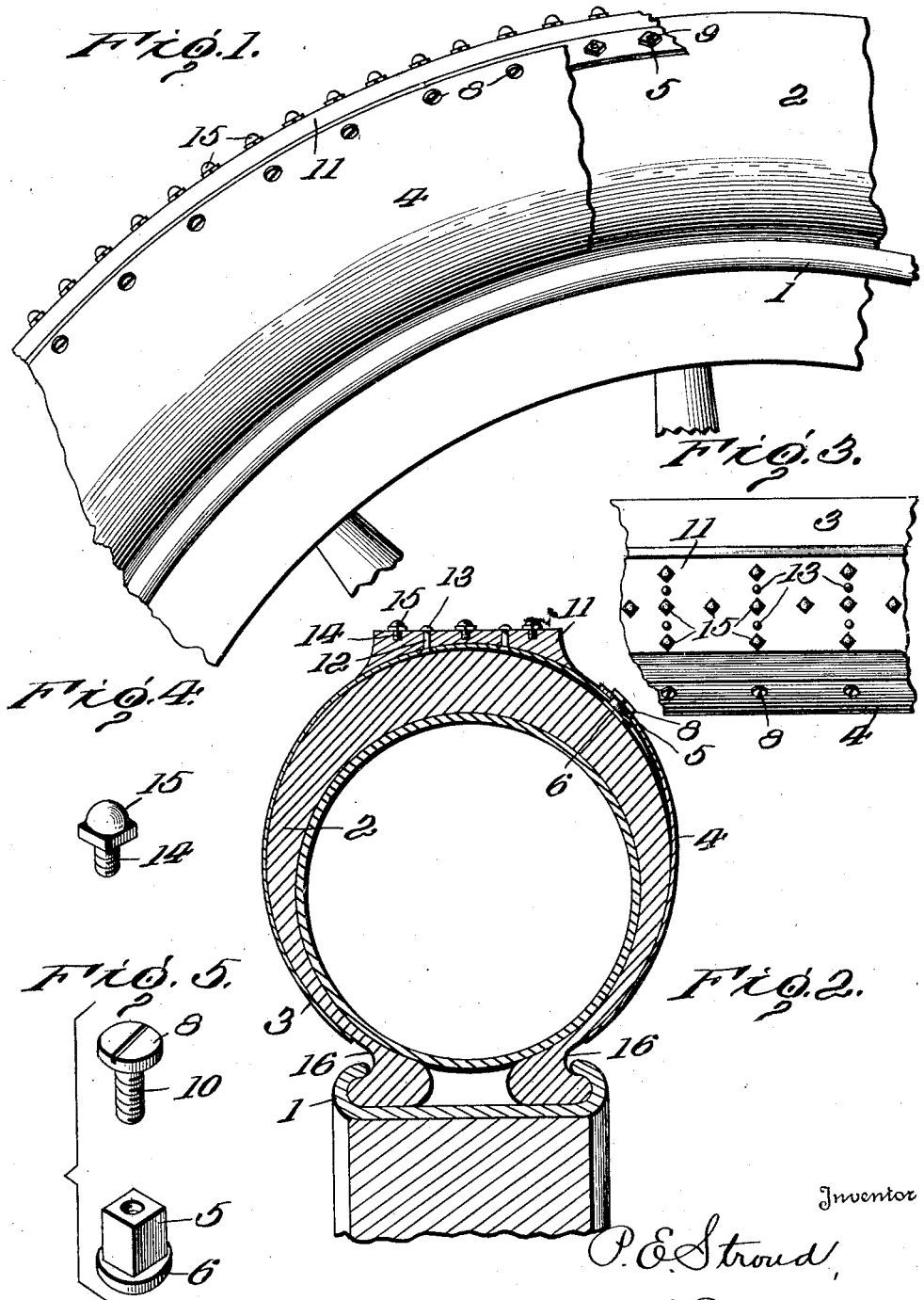

PEARL E. STROUD, OF SOUTH HEART, NORTH DAKOTA.

TIRE-PROTECTING CASING.

1,395,162.  Specification of Letters Patent.  Patented Oct. 25, 1921.

Application filed June 16, 1919. Serial No. 304,367.

*To all whom it may concern:*

Be it known that I, PEARL E. STROUD, a citizen of the United States, residing at South Heart, in the county of Stark and State of North Dakota, have invented certain new and useful Improvements in Tire-Protecting Casings, of which the following is a specification, reference being had therein to the accompanying drawing.

This invention relates to improvements in tire protecting casings, and more particularly for automobile tires and is to be used as a protecting armor to the regular tire of an automobile.

The object of this invention is to provide an automobile tire protecting casing that protects the tire and is easily and readily attached to and detached from a tire.

Another object of this invention is to so construct the protecting casing that it not only protects the tire, but will also prevent skidding.

A further object of this invention is to construct a tire protecting casing having a non-skid element which may be readily renewed.

This invention is adapted to be used with either new or old tires.

In the accompanying drawing—

Figure 1 is a fragmental perspective view of my protecting casing applied to a tire.

Fig. 2 is a cross-sectional view of a tire with my improved protecting casing applied thereto.

Fig. 3 is a top plan view of the protecting casing.

Fig. 4 is a detail perspective view of one of the tread studs.

Fig. 5 is a detail perspective view of the bolt used to fasten the two parts of the casing together, the parts being shown in separated relation.

Referring now to the drawings in detail, in which like references designate similar parts throughout the several figures.

In the drawings, 1 designates the rim of a wheel, on which is mounted in any suitable manner the tire 2.

The mounting of the tire on the rim forms no part of this invention and in the drawings is shown what is known as the "clencher" tire and rim.

My improved protecting casing comprises a piece 3 curved in cross-section, which fits one side, the tread and about a quarter of the other side of the tire throughout its periphery. The remainder of the tire is carried by the curved strip 4, which overlaps slightly and is fastened to the piece 3 by bolts spaced at intervals throughout the periphery of the casing.

These bolts comprise a square shank 5, with a rounded head 6, which rests against the outside of the tire 2. The shank 5 is provided with a screw threaded opening 7. The two parts of the protecting casing 3 and 4 are provided with squared openings 8 and 9 through which the shank 5 extends outwardly.

When the openings in the members 3 and 4 are matched and the shank 5 has been thrust outwardly through them, the fastening is completed by inserting the screw 10 into the opening 7 of the shank 5 until the two parts of the casing are tightly clamped together.

Upon the member 3 of the casing is fastened a tread 11 by suitable countersunk rivets 12, with heads 13. The tread is provided with screw-threaded openings 14, into which are screwed the studs or calks 15, which may have a head of any desired shape but preferably rounded, as shown in the drawings.

This protecting casing is made preferably of steel, as is also the tread 11, but it is understood that this casing could be made of some other material without a departure from the spirit of this invention.

It will be readily understood that the studs 15 not only prevent wear upon the tire and the tread of the protecting casing, but also act as non-skid elements and prevent skidding of the tire and wheel. When the studs 15 are worn down to such an extent that skidding might occur, they may be removed and new ones readily put in their places.

The casing when assembled and in place on the tire is so made that at the bottom of each side of the tire, just above the rim of the wheel, there is a small part of the tire, as indicated at 16, not covered. This is constructed in this manner so that the casing can work with the tire and there will be no chance of the casing kneading or buckling against the rim.

As shown in Fig. 3, the studs or calks are placed three in a row across the tread, the rows about two inches apart, with one calk in the center of the space between the rows.

From the foregoing it will be observed that the members 3 and 4 extend entirely around the adjacent surface of the tire 2 and, therefore, each of them is a complete circle. Preferably, these members 3 and 4 are made each of a single piece. They will be of thin flexible material so that when applied and secured, as shown, the protecting casing formed thereby will readily give up and down with the spring of the tire, while at the same time, it will protect the tire from punctures and from the roughness of the road-bed. The tread 11 will, of course, take the major portion of the wear of the tire by direct engagement with the road-bed and will be of a sufficient thickness to spring with or follow the movement of the tire due to the weight of the vehicle. It is of sufficient thickness to withstand the blows from rocks, stones, etc.

By making the member 3 cover about two-thirds of the tire 2, the member 3 can first be applied to the tire when in its deflated condition and while in this deflated condition the bolts 5 can be passed through registering openings 8 and 9 of the overlapping portions of the members 3 and 4, and the screws 10 applied thereto. At the same time the members 3 and 4 can be removed from the tire should it become necessary to do so.

Having thus described my invention, what I claim and desire to secure by Letters Patent is:—

1. The combination with a pneumatic tire casing, of a detachable sheet metal tire protecting casing embracing and tightly fitting the entire outer surface of the casing from points adjacent to or slightly removed from the inner periphery of the casing, the sheet metal casing comprising a wide section and a narrow section, each a complete circle and curved in cross-section corresponding to and tightly fitting the outer surface of the tire casing, the wide section covering approximately two-thirds of the tire casing, including its tread, and the narrow section covering the remaining third of the tire casing, the adjacent edges of the sections overlapping and firmly detachably connected, whereby the sheet metal casing is held to the tire casing solely by the inflation thereof and attachable thereto and detachable therefrom.

2. The combination with a pneumatic tire casing, of a thin sheet metal protecting casing embracing the outer surface of the tire casing from points adjacent the inner periphery of the tire casing, the sheet-metal casing comprising a wide and a narrow part, each a complete circle and curved to correspond to and tightly fit the outer surface of the tire casing, the wide section extending across the tread of the tire and the narrow casing firmly and detachably connected to that edge of the tire section nearest the tread of the tire, whereby the sheet metal is held to the tire casing solely by the inflation of the latter and is attachable thereto and detachable therefrom.

3. The combination with a pneumatic tire casing, of a thin sheet metal protecting casing embracing the entire outer surface of the tire casing from points adjacent the inner periphery of the tire casing, the sheet metal casing consisting of two sections, each a complete circle and curved in cross-section to correspond to and tightly fit the outer surface of the tire casing, the wide section extending across the tire tread, and the narrow section lapping the edge of the wide section nearest the tread of the tire and detachably and firmly connected thereto, a projecting annular tread on the outer surface of the wide section opposite the tire tread, whereby the sheet metal casing is held to the tire casing solely by the inflation thereof and is attachable thereto and detachable therefrom.

In testimony whereof I hereunto affix my signature.

PEARL E. STROUD.